Dec. 2, 1969         KIYOSHI INOUE         3,481,839
METHOD OF DEPOSITING SUBSTANCES ON AND DIFFUSING THEM INTO
CONDUCTIVE BODIES UNDER HIGH-FREQUENCY ELECTRIC FIELD
Filed Oct. 20, 1964                                 3 Sheets-Sheet 1

Kiyoshi Inoue
INVENTOR.

BY

Karl G. Ross
AGENT

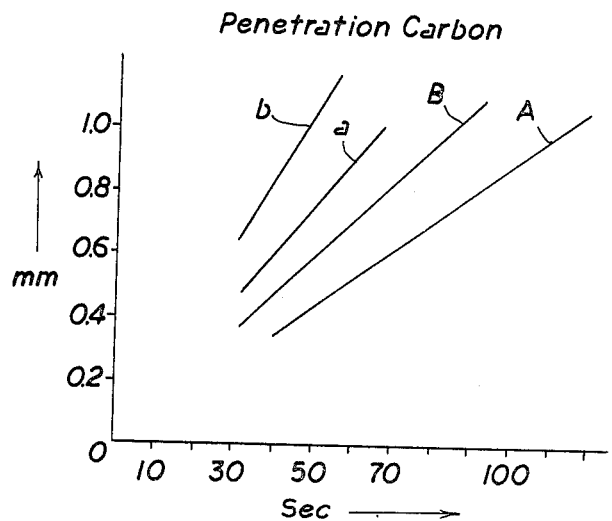
Fig.3
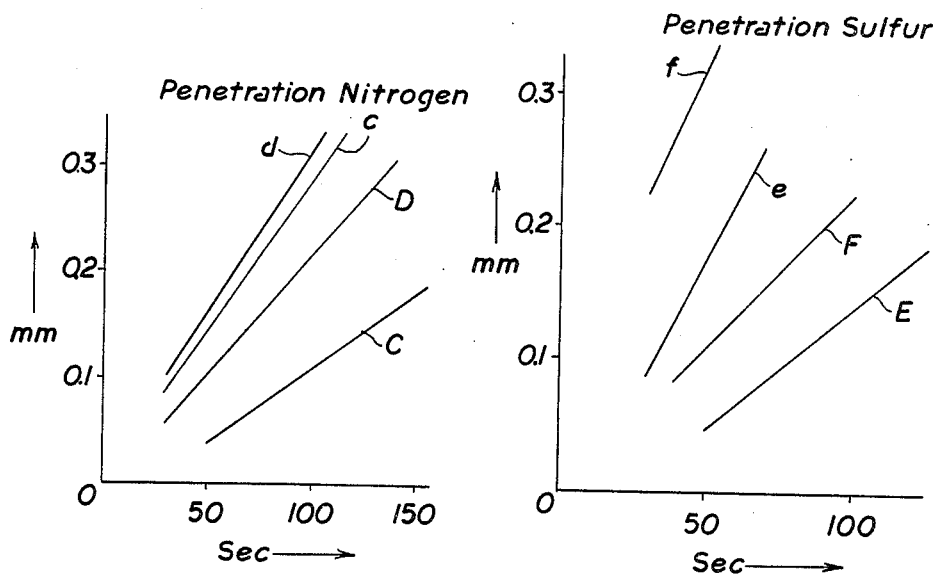
Fig.4
Fig.5
Kiyoshi Inoue
INVENTOR.
BY Karl G. Ross
AGENT

United States Patent Office 3,481,839
Patented Dec. 2, 1969

3,481,839
METHOD OF DEPOSITING SUBSTANCES ON AND DIFFUSING THEM INTO CONDUCTIVE BODIES UNDER HIGH-FREQUENCY ELECTRIC FIELD
Kiyoshi Inoue, 182 3-chome, Tamagawayoga-machi, Setagaya-ku, Japan
Filed Oct. 20, 1964, Ser. No. 405,051
Claims priority, application Japan, Oct. 21, 1963, 38/55,819; Feb. 3, 1964, 39/5,501, 39/5,506
Int. Cl. B01k 5/02; C23b 13/00; B32b 9/04
U.S. Cl. 204—14             4 Claims

ABSTRACT OF THE DISCLOSURE

Method of depositing substances on conductive bodies and diffusing them into such bodies wherein migration of the substance in solution or suspension is induced by a unidirectional (predominantly D.C.) electric field across the body and a counterelectrode through an electrolyte or dielectric liquid, decomposition or dissociation of the migrating substance is effected by thermal means, thereby depositing the substance on the body, and an electric field is superimposed on the unidirectional field with a frequency of 100 kc. to the order of megacycles to promote diffusion of the deposited substance into the body.

---

My present invention relates to a method of depositing substances on conductive bodies and, more particularly, to a method of depositing substances on such bodies whereby the substances can be diffused into the bodies.

In my copending applications Ser. Nos. 356,714 and 247,387, filed Apr. 2, 1964, and Dec. 26, 1962, respectively (now U.S. Patents No. 3,250,892 and No. 3,340,052), I disclose a method of depositing substances upon a conductive body whereby the energy required for bonding of the substances to the body is obtained from electrical pulses, i.e., electric-spark discharge. In my further applications Ser. Nos. 256,789 (now U.S. Patent No. 3,232,747) and 256,790 (now U.S. Patent No. 3,198,675), divided from application Ser. No. 49,625 of Aug. 15, 1960, which has matured into U.S. Patent No. 3,098,151, I disclose that electrolytes can be used for the heating of conductive bodies for various purposes. Electrolytic heating of the bodies is effected by passing a current through an electrolyte between the body to be heated and a counterelectrode juxtaposed therewith. Similarly, in my previous disclosures relating to the deposition of substances upon conductive bodies, electric fields have been used, via spark discharge, to deposit a substance upon the conductive body and then effect re-formation of the crystal lattice at least in part by diffusion of a deposited substance into the interstices of the crystal lattice of the body. I have now found, surprisingly, that it is possible to make use of some of the principles of these earlier applications in depositing substances upon conductive bodies under different circumstances and in such manner as to enable the subsequent diffusion of a substance into the crystal lattice of the body. In this connection, it may be noted that it is a common problem in the metallurgical field to provide surface zones of metallic bodies which are rich in elements to be found only limitedly in the interior of these bodies. In the case-hardening of steels, for example, it is desirable to increase the carbon concentration in the region of the surface of the steel body; this can be effected by surrounding the body with a carboniferous material and subjecting the body, in the presence of this carbon, to heat treatment. It has also been proposed to effect a nitrogen hardening or nitrification of metallic bodies, i.e., a significant increase in the nitrogen concentration, in spite of the fact that almost all the metallurgical processes leading up to the final formation of the body are designed to eliminate nitrogen from the metallurgical composition. Similarly, it may be desired to diffuse sulfur, phosphorus or other elements into surface zones of the body, e.g., to vary the frictional characteristics of the surface, its softness, workability or other physical characteristic. It may even be desired to form a new compound at the surface by diffusion of one or another element into the crystal lattice of the zone. In this manner, a surface layer of molybdenum disulfide can be considered to form in the surface zone of a molybdenum body upon diffusion of sulfur into this zone.

Another problem frequently met in the metallurgical field is the bonding of organic substances to the surface of a metallic body. Thus, while it is known to bond organic polymers (polytetrafluoroethylene, silicones or the like) to metallic substrates in order to decrease the frictional coefficient of their surfaces, complex heat treatment and various other expedients are required to insure that a firm bond can be formed and that this bond will be able to withstand mechanical abrasion, thermal stress, and mechanical deformation of the surface zone.

Still another problem experienced by the metallurgical field can be found in the treatment hitherto required to increase the surface hardness of a metallic body. As previously mentioned, one of these surface treatments involves the case-hardening or nitrification of a surface zone of the metallic body. Other techniques involve bonding by thermal or mechanical means (e.g., sintering) of materials having a relatively high hardness to the relatively softer substrate.

It is, therefore, the principal object of my present invention to provide an improved method of bonding of substances to metallic surfaces and for the diffusion of elements (e.g., nitrogen carbon and sulphur) into the lattice of a substrate, at least along surface zones thereof.

Still another object of the present invention is to provide an improved process for the bonding of polymeric materials to metallic substrates.

It is a further object of this invention to provide an improved method for the carbonization, nitrification, etc. of metallurgical substrates such as steels.

These objects and others which will become apparent hereinafter are attained in accordance with the principles of the present invention, by a method which involves a deposition of the substance to be bonded to the substrate or diffused into the crystal lattice thereof from an electrolyte with the aid of an electric field; generating sufficient heat at the electrolyte/substrate interface to permit at least partial diffusion or interdiffusion at this interface by means of electrical energy; and advantageously facilitating the penetration into the crystal lattice of the substrate by the use of high-frequency fields whose purpose will be discussed in greater detail hereinafter. An important feature of the present invention involves the combined deposition at the surface of the substrate of ionic species or fragments containing the element or elements to be diffused in the crystal lattice, and the fragmentation or decomposition of these species at the surface upon such deposition to make available an element capable of penetrating the lattice. Thus, according to one specific feature of the present invention, anions of a soluble salt, preferably an anion consisting of the element to be diffused in combination with oxygen, may be considered to migrate under the action of an essentially unidirectional electric field to deposit on the substrate at which the deposited anion can be fragmented by electrical discharge energy or electrically produced thermal energy. Continuance of the current flow subsequent to the deposition and decomposition of anions results in a penetration of elemental fragments into the lattice structure.

Surprisingly, this elemental diffusion into a lattice structure takes place not only at the anode but also at the cathode especially when a high frequency alternating current is superimposed on the direct current. This result is believed to be due to the fact that some deposition of the compounds containing the anions are deposited at the cathode as a result of the thermal energy developed at the interface. Thereafter, diffusion occurs under the impetus of the heating of the surface region of the electrode.

According to still another feature of the present invention, the electrolyte contains an organic or inorganic salt whose anions and cations induce respectively migrate to the anode and cathode across which the direct current is passed. Upon decomposition of the cation and anion the diffusable element respectively penetrates the respective lattice. Thus a steel body can be "case-hardened" in an electrolyte having anion containing carbon (e.g., acetate, carbonate, or bicarbonate anions). When it is desired to increase the sulphur content in a surface zone of a steel or molybdenum body to reduce the sliding friction of the surface or achieve some other similar purpose, the electrolyte can contain sulfite, sulfide or sulfate anions although the high thermal stability of the latter renders their use uneconomical in many instances. The electrolyte can thus contain anions having a high proportion of available sulphur (preferably thiosulphate) or sulphide e.g., ammonium sulfide or an organic sulfide such as methyl mercaptan. Nitrification of a metallic body can be effected using electrolyte solutions containing nitrate, nitrite or other nitrogen-containing anions in combination with nitrogen-containing cations such as ammonium ions.

The principle of the present invention, according to another aspect thereof, can also be applied to the diffusion of compounds which are not fully decomposed at the time of penetration into the crystal lattice of the substrate. For example, it has been found to be possible to bond tungsten carbide to and to diffuse it into a steel substrate by suspending the tungsten-carbide powder in an oil which functions as an electrolyte of sorts. Surprisingly, a high proportion of a conductive powder (e.g., say 50% by weight) will render the vehicle sufficiently conductive to permit deposition of the powder under the influence of the electric field if the powder is more or less charged or admits of molecular motion to carry the powder to the surface of the electrolyte at which the high-current electrical energy develops sufficient heat to permit diffusion and bonding. The rate at which the powder will deposit and bond to the electrode surface can be increased by vibrating the electrodes transversely to their confronting surfaces and in the direction of current flow at a sonic frequency (from about 50 cycles (50 Hz.) to the order of kilocycles (kHz.). Additionally, it has been found to be advantageous to oscillate the electrodes in the plane of the surfaces to be treated at somewhat higher frequencies also within the sonic range.

According to still another aspect of this invention, an organic polymer (i.e., of a fluorocarbon, silicone, or the like) can be deposited upon a metallic workpiece by electric heating at the interface of an aqueous suspension of synthetic-resin particles. The degree of the heating of the resin layers to the substrate is vastly superior to that obtained by conventional methods involving the chemical deposition of the substances on substrate.

It has been found, according to an important feature of the present invention, that in all of the cases mentioned above, the rate of elemental penetration into surface zones of a metallic body, the depth of penetration, or the extent of formation of a surface layer, or the degree of adhesion of a substance to the surface of the body, can be sharply increased through the use of an alternating current of high frequency superimposed upon the direct or heating current. The significance of high-frequency alternating current which, according to the principles of the instant invention, should be preferably in the megacycle range and not less than about 100 kilocycles, is indeed surprising since it has been proposed to use alternating currents to prevent the fouling of electrodes for electrolysis purposes or the like. It is, therefore, totally unexpected to find that not only does the high-frequency current not prevent deposition of the various substances with which the present invention is concerned, but, on the contrary, the rates of penetration of this substance and the strength of the bonding is markedly increased. While it is believed that this increase in bonding strength and rate of diffusion is a consequence of a reduction in the barrier energy with which a particle must be provided to penetrate the lattice of the substrate, it is by no means certain and applicant does not wish to be bound by any theory in this regard. It may be observed, however, that penetration of a crystal lattice from the exterior may be considered analogous to the work function of emission of an electron from a surface; in both cases a characteristic energy is required, before the event can be induced to occur. It has been found that the use of the high-frequency alternating current referred to above can, at least to an extent, reduce this characteristic energy so that penetration occurs more quickly and improved bonding results.

The above and other objects, features and advantages of the present invention will become more readily apparent from the following description and specific examples, reference being made to the accompanying drawing in which:

FIG. 3 is a graph showing the depth of penetration of carbon into a steel substrate, plotted as the ordinate against time as the abscissa;

FIG. 4 is a similar graph illustrating nitrification of a substrate;

FIG. 5 is another graph illustrating the results of sulphurization, according to the present invention;

Figure 1:
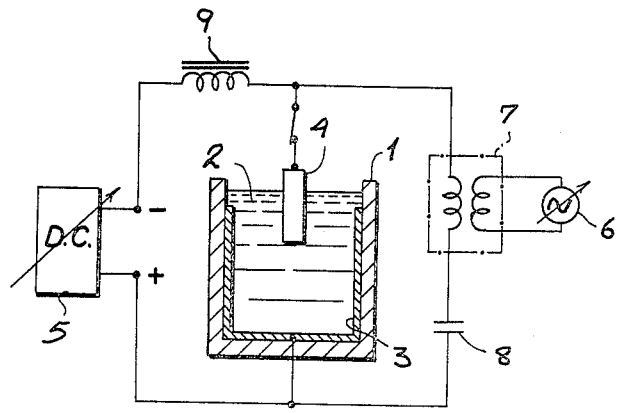
FIG. 1 is a diagrammatic view of an apparatus for carbonizing bodies, in accordance with the present invention.
Figure 2:
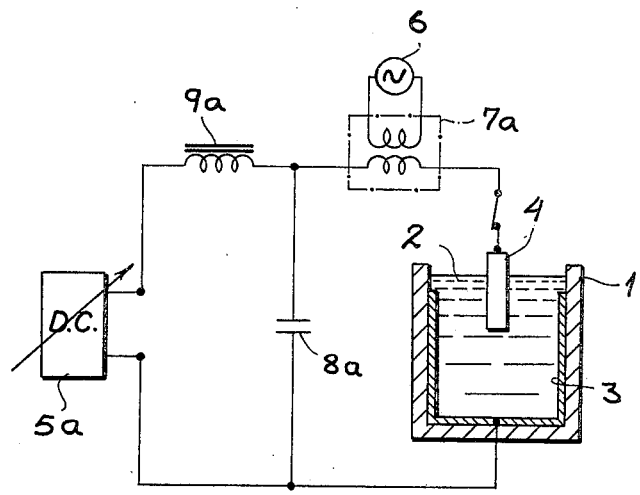
FIG. 2 is a similar view of a modified arrangement.

In FIG. 1 of the drawing, I show a vessel 1 having a conductive lining 3 formed as an anode and receiving an electrolyte 2. The cylindrical vessel 1 surrounds the axially extending conductive body 4 into which elemental penetration is desired. A relatively low-voltage, high-current current source 5 is connected across the electrodes 3, 4 so that the workpiece 4 is rendered cathodic. In practice it has been found to be immaterial which pole of the D.C. source is connected to the workpiece since deposition occurs principally by virtue of the thermal energy produced, and the rate of penetration is not as much a function of the rate at which material deposits as it is determined by the ability of the workpiece to permit penetration of the element. When, for example, carbonates and other corresponding anions are used and the anion contains an element (i.e., oxygen) which is somewhat more electronegative than the element whose diffusion is desired, it has been found to be advantageous to render the workpiece cathodic and thus preferably diffuse carbon, or nitrogen in the presence of oxygen, oxygen being present in most electrolytes in any event. A high-frequency field can be applied across the electrodes 3, 4 via the coupling transformer 7 whose primary is energized by an A.C. source such as the variable-frequency oscillator 6 whose output is in the megacycle range. A D.C. blocking capacitor 8 is connected in series with the secondary winding of the transformer 7 and can, in accordance with a feature of this invention, constitute a series-resonant network, tuned to a preferred supply frequency at which the oscillator 6 can be set. A choke 9 provides the desirable inductive impedance in the D.C. circuit, thereby providing a high reactance to the flow through the D.C. source of the high-frequency alternating current from transformer 7. In the arrangement of FIG. 2, the D.C. source 5a is connected across the capacitor 8a in series with the secondary winding of transformer 7a. The arrangement of choke 9a and capacitor 8a in conjunction with the source 5a provides the possibility of discharge through the electrolyte at the rate dependent upon the capacity of condenser 8a. This mode of heating, described in my Patent No. 3,098,151 is applicable here as well. In other respects, however, the system in FIGS. 1 and 2 are similar.

EXAMPLE I

Diffusion of carbon into a metallic substrate

A 0.15%-carbon steel rod 4 of 10-mm. diameter was immersed in an aqueous solution of potassium acetate, having a specific gravity of 1.18, to a depth of 2.5 mm. The electrolyte temperature was 35° C. and a cylindrical counterelectrode 3 was spaced from the workpiece by radial distance of 20 cm. A direct-current voltage of 70 v. was applied between the counterelectrode 3 and the workpiece 4 and a current of 8 amps passed therebetween with a current density of 3 amps per cm.$^2$. The workpiece is thereby raised to a temperature of 100° C. with an immeasurably higher temperature at the interface. The depth of penetration of carbon into the workpiece in millimeters versus treatment time in seconds is shown by curve A of FIG. 3. Sodium carbonate and sodium bicarbonate can be substituted for the potassium acetate, in equivalent concentrations, with similar results.

EXAMPLE II

The method of Example I was carried out except that a high-frequency alternating current of 3 megacycles per second (3 mHz.) was applied by the source 6 across the electrode 3 and the workpiece 4. The A.C. current was 3 amps and the A.C. voltage was 10 to 20 volts. The penetration vs. time is indicated by curve $a$ of FIG. 3.

EXAMPLE III

The workpiece of Example I was used except that the initial temperature of the electrolyte was 85° C. and a D.C. voltage of 90 volts was applied between the workpiece and the counterelectrode. A current density of 4 amps/cm.$^2$ and a total current of 13 amps was employed. The workpiece is raised to a temperature of about 800° C. along its surface. The carbon penetration vs. time is illustrated in curve B of FIG. 3.

EXAMPLE IV

A 3-megacycles-per-second (3 mHz.) high-frequency alternating current (3 amps, 10 to 20 volts) is superimposed upon the current supplied in Example III. Depth of penetration of carbon vs. time is shown in graph $b$ of FIG. 3.

EXAMPLE V

Diffusion for sulphur into steel 5 to 10 mm. of a 0.07%-carbon-steel rod having a width of 5 mm. and a thickness of 10 mm. was immersed in an electrolyte consisting of aqueous sodium thiosulfate having a specific gravity of 1.20. The electrolyte temperature was 70° C. and a D.C. voltage of 90 volts at 9 to 10 amps was applied across the electrode and the workpiece; the latter is thereby brought to a temperature of 100° C. with a higher temperature at the interface. The depth of sulphur penetration vs. time is indicated in curve E of FIG. 5. When equivalent concentrations of ammonium sulphide and methyl mercaptan were substituted for the sodium thiosulfate, similar results were obtained.

EXAMPLE VI

The method of Example V was carried out with an electrolyte temperature of 40° C. and a voltage of 110 volts with a current of 11–13 amps. The temperature at the workpiece surface is 800° C. The sulphur-penetration results are shown in curve F of FIG. 5.

EXAMPLE VII

The method of Example V is followed except that an alternating current of 3 megacycles per second (3 mHz.), 10 to 20 volts and 5 amps was superimposed upon the direct current of that example. The sulphur-penetration results are illustrated in curve $e$ of FIG. 5.

EXAMPLE VIII

The Example VI is carried out with an alternating-current superimposition as recited in Example VII. The results obtained for sulphur penetration are those illustrated in curve $f$ of FIG. 5.

EXAMPLE IX

Nitrogen diffusion into steel

The electrolyte consisted of an aqueous solution of urea (specific gravity 1.15) although ammonia solutions and ammonium nitrate were also found to be suitable in equivalent concentrations. The nitrogen-penetration results are shown in curve C of FIG. 4. They were obtained when the workpiece of Example V was treated with a voltage of 250 volts. The electrolyte temperature was 95° C. and, at a D.C. current of 3 to 4 amps, a temperature of 100° C. was obtained.

EXAMPLE X

When the electrolyte temperature of Example IX was 95° C., a voltage of 320 volts with a current of 4.5 amps, resulted in a workpiece temperature of 750° C. The nitrogen-penetration results obtained were those illustrated in curve D of FIG. 4.

EXAMPLE XI

When 3-megacycle alternating current (10 to 20 volts, 3 amps) was superimposed on the direct current of Example IX, a nitrogen penetration as illustrated in curve $c$ of FIG. 4 was obtained.

EXAMPLE XII

The high-frequency alternating current of Example XI was used with the system of Example X, the results obtained being illustrated in curve $d$ of FIG. 4.

From each of the graphs (FIGS. 3–5), it will be seen that the respective small-letter curve ($a$, $b$, $c$, $d$, $e$, $f$) has generally a greater slope and a higher value for its intercepts than the corresponding capital-letter curve (A, B, C, D, E, F), thereby indicating that the rate of penetration of the respective elements into the surface zones of the substrate is significantly greater when a high-frequency alternating current is used in addiiton to the direct current. It is also apparent that the total penetration is greater after a given process time when high-frequency A.C. is used. Surprisingly, the high-frequency signal yields results far better than those obtainable when a similar amount of D.C. power is added by increasing the direct-current amplitude.

Figure 6:
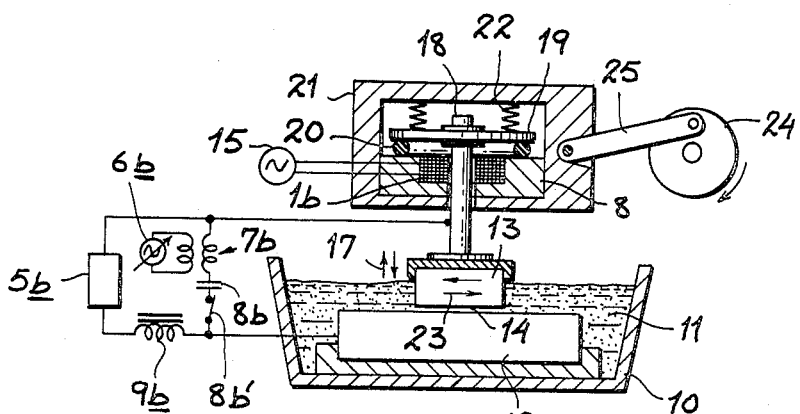
FIG. 6 is a vertical cross-sectional view through an apparatus according to this invention, for coating metallic surfaces with tungsten carbide.

In FIG. 6, I show an arrangement for the bonding of tungsten carbide into a metallic body and its diffusion into the lattice of the latter. The apparatus includes a vessel 10 containing a mixture 11 of oil and tungsten-carbide particulars, this mixture surrounding a pair of electrodes 12, 13, which form the gap 14 between them. The upper electrode 13 is vertically vibratable (arrows 17) by an electromagnet 16 energized by a low-frequency alternating source 15. The armature 18 within the solenoid coil 15 is provided with a plate 19 resting upon a rubber O-ring 20 within a housing 21. Springs 22 resiliently hold the plate 19 against the O-ring 20. It will be apparent that, when source 15 energizes the solenoid 16, the workpiece 13 will be vibrated perpendicular to the juxtaposed faces of the electrodes 12, 13. In addition, the electrodes 12, 13 are relatively displaceable in their respective plans parallel to this juxtaposed surface, i e., in the direction of arrows 23. For this purpose the housing 21 is provided with a crank 24 connected with it via a link 25 whereby rotation of crank 24 oscillates the housing 21 in the horizontal plane. A direct-current source 5b operating through a choke is connected across the electrodes 12, 13 as previously described via a high-frequency A.C. source 6b. The latter energizes a transformer 7b whose secondary winding is connected in series with capacitance 8b across the electrodes. A switch 8b' is also connected in series with the capacitor across the electrodes to enable the high-frequency current to be cut out.

Figure 7:
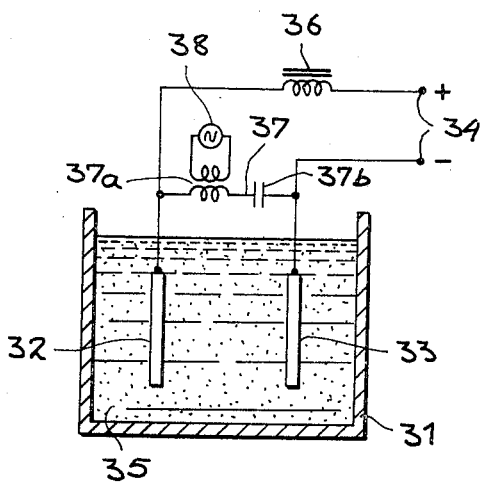
FIG. 7 is another diagrammatical cross-sectional view illustrating the coating of surfaces with synthetic-resin particles.

The apparatus of FIG. 7 is designed to coat the electrodes 32, 33 with synthetic-resin particles which then form a substantial continuous layer; the apparatus includes a vessel 31 in which the electrodes 32, 33 are immersed in a suspension 35 of the resin particles in a suitable vehicle. A direct-current source 34, represented by the positive and negative terminals shown in FIG. 7 is connected via the choke 36 across the electrodes 32, 33. A high-frequency alternating current source 38 is connected across the electrodes via a transformer 37 whose primary winding 37a is in series with capacitor 37b.

EXAMPLE XIII

Using the apparatus of FIG. 6, tungsten-carbide powder is diffused into and bonded to a pair of juxtaposed electrodes, whose surface areas are 25 mm. in length and 25 mm. in width and which are composed of 0.15%-carbon steel, and immersed in machine oil in which tungsten-carbide powder (average particle size $0.5\mu$) is suspended (equal parts by weight of powder and oil). The electrodes are vibrated transversely to their juxtaposed surface areas (arrows 17) at 100 cycles/second with a "contact" pressure of 100 g./cm.$^2$ as they approach and are oscillated in the plane of their juxtaposed surfaces at 500 cycles/sec. (500 Hz.) At their distance of closest approach, a voltage of 0.5 volt, 100 amps is applied between the electrodes which, at this joint, have a gap 14 of approximately 0.02 mm. After three hours of treatment, a tungsten-carbide-diffusion zone $20\mu$ in thickness is observed.

EXAMPLE XIV

When the method of Example XIII is employed with 3-megacycles-per-second (3 mHz.) alternating current, 10 volts, 3 amps superimposed on the direct current of that example, a diffusion zone $20\mu$ in thickness is obtained after one half-hour at the positively charged electrode. The negatively charged electrode is found, after a treatment period of one half-hour, to have a diffusion zone $40\mu$ in thickness. The temperature of the transformer oil rose during the treatment from 25° C. to 90° C. Frequencies from 500 kilocycles to upwards of 10 megacycles per second (10 mHz.) were found to be suitable.

EXAMPLE XV

Coating of metal with organic polymer

A 3 to 5% aqueous solution of n-butyl phosphate in which Teflon particles ($3\mu$ average particle size) were suspended is used to treat a steel workpiece having a total exposed surface area in the electrolyte of 100 cm.$^2$. A D.C. field of 2–30 volts/cm. at a current of 1 amp was applied between the workpiece and a counterelectrode while a relatively low-frequency alternating current (750 cycles/sec. (750 Hz.) at 0.8 amp) was superimposed thereon. A high-frequency alternating current of 6 megacycles/second, 300 volts, 0.6 amp was also superimposed upon the direct current and a treatment time of 50 minutes used. After removal of the workpiece from the electrolyte, it was dried at a temperature of 400° C. for 10 minutes and found to have received a substantially uniform layer which ranged from 0.3 mm. to 0.8 mm. in thickness in a series of tests. The force necessary to remove the layer was between 50 and 70 kg./cm.$^2$, this being the adhesion force. Conventional Teflon coatings produced by chemical deposition of polytetrafluorethylene upon metallic surfaces have an adhesion range between 5 and 7 kg./cm.$^2$ before the usual heat (curing) treatment.

I claim:
1. A method of coating a conductive body with tungsten carbide, comprising the steps of suspending particles of tungsten carbide in a nonconductive liquid; juxtaposing with said body in said liquid a counterelectrode having a surface proximal to a surface of said body to be coated with tungsten carbide; passing a substantially direct electric current between said body and said electrode through said liquid rendered at least partly conductive by said particles and at a voltage and current density sufficient to generate at the interface between said body and said liquid a temperature capable of effecting bonding of said particles to said surface of said body; oscillating one of said surfaces toward and away from each other of said surfaces to alternately increase and decrease the gap between said surfaces at a sonic frequency; and superimposing on said counterelectrode and said body a high-frequency alternating current facilitating penetration of tungsten carbide into at least a surface zone of said body.

2. A method of depositing a substance on a conductive body, comprising the steps of immersing said body in a dielectric liquid having said substance distributed therein in the form of a substantially nonionized powder; juxtaposing said body with a counterelectrode in said liquid; passing a direct electric current through said liquid between said body and said counterelectrode to generate sufficient heat to effect deposition of said substance as said powder upon said body; superimposing upon said direct electric current a high-frequency alternating electric field at a frequency of substantially 100 kHz. to the order of megacycles per second, and capable of activating the lattice of said body, across said body and said counterelectrode at a power in conjunction with that of said direct electric current sufficient to bond said substance to said body with penetration of the body by said substance; and oscillating the surface of said counterelectrode in close juxtaposition with said body relatively thereto at a frequency of 50 cycles to kilocycles per second and in the sonic range.

3. A method of depositing tungsten carbide on a conductive body, comprising the steps of immersing said body in a dielectric liquid containing tungsten carbide distributed therein in the form of a powder; juxtaposing said body with a counterelectrode in said liquids passing a direct electric current through said liquid between said body and said counterelectrode to generate sufficient heat to effect deposition of said powder upon said body; superimposing upon said direct electric current a high-frequency alternating electric field at a frequency of substantially 100 kilocycles to the order of megacycles per second, and capable of activating the lattice of said body, across said body and said counterelectrode at a power in conjunction with that of said direct electric current sufficient to bond said tungsten carbide to said body with penetration of the body by said tungsten carbide; and oscillating the surface of said counterelectrode in close juxtaposition with said body relatively thereto at a frequency of 50 cycles to kilocycles per second and in the sonic range.

4. The method defined in claim 3 wherein said liquid is oil, said counterelectrode forms a narrow gap with said body while having a surface closely juxtaposed with said body in contact with said liquid and the powder dispersed therein, said surface is oscillated in the direction of the other of said surfaces at a first sonic frequency, and said surface is oscillated parallel to itself at a second sonic frequency higher than that of the first sonic frequency.

(References on following page)

References Cited

UNITED STATES PATENTS

| | | | |
|---|---|---|---|
| 1,428,050 | 9/1922 | Wickum | 204—14 |
| 1,953,647 | 4/1934 | Darrah | 148—15 |
| 2,522,082 | 9/1950 | Arnold | 18—48 |
| 2,864,755 | 12/1958 | Rothacker | 204—165 |
| 3,161,702 | 12/1964 | Howington | 264—23 |
| 3,188,245 | 6/1965 | Inoue | 148—13 |
| 1,726,431 | 8/1929 | Fourment | 219—9.5 XR |
| 971,641 | 10/1910 | Rice et al. | 204—56 |
| 1,945,623 | 2/1934 | Theiss | 204—1 |
| 2,014,169 | 9/1935 | Edelman | 204—56 X |
| 2,057,274 | 10/1936 | Mayhew | 148—18 |
| 2,702,260 | 2/1955 | Massa | 204—14 X |
| 2,936,218 | 5/1960 | McNeill et al. | 204—181 X |
| 2,999,798 | 9/1961 | Eitel et al. | 204—34 |

FOREIGN PATENTS

| | | |
|---|---|---|
| 390,141 | 6/1933 | Great Britain. |
| 866,780 | 6/1957 | Great Britain. |
| 13,506 | 1963 | Japan. |
| 414,939 | 11/1963 | Great Britain. |

JOHN H. MACK, Primary Examiner

W. B. VAN SISE, Assistant Examiner

U.S. Cl. X.R.

204—29, 35, 181, 38; 29—487